(12) United States Patent
Hardage et al.

(10) Patent No.: US 8,972,701 B2
(45) Date of Patent: Mar. 3, 2015

(54) SETTING ZERO BITS IN ARCHITECTURAL REGISTER FOR STORING DESTINATION OPERAND OF SMALLER SIZE BASED ON CORRESPONDING ZERO FLAG ATTACHED TO RENAMED PHYSICAL REGISTER

(75) Inventors: James Nolan Hardage, Austin, TX (US); Glen Andrew Harris, Austin, TX (US); Mark Carpenter Glass, Dripping Springs, TX (US)

(73) Assignee: ARM Limited, Cambridge (GB)

( * ) Notice: Subject to any disclaimer, the term of this patent is extended or adjusted under 35 U.S.C. 154(b) by 597 days.

(21) Appl. No.: 13/312,131

(22) Filed: Dec. 6, 2011

(65) Prior Publication Data

US 2013/0145127 A1      Jun. 6, 2013

(51) Int. Cl.
*G06F 9/30*     (2006.01)
*G06F 1/32*     (2006.01)

(52) U.S. Cl.
CPC .......... *G06F 9/30003* (2013.01); *G06F 1/3234* (2013.01); *G06F 9/30112* (2013.01)
USPC ....... 712/217; 712/210; 712/E9.023; 713/320

(58) Field of Classification Search
CPC . G06F 9/384; G06F 9/30014; G06F 9/30112; G06F 9/3016; G06F 9/30098–9/30105; G06F 9/30192
See application file for complete search history.

(56) References Cited

U.S. PATENT DOCUMENTS

| | | | | |
|---|---|---|---|---|
| 5,471,633 | A | * | 11/1995 | Colwell et al. .................. 712/23 |
| 5,564,056 | A | | 10/1996 | Fetterman et al. |
| 7,979,681 | B2 | * | 7/2011 | Venkumahanti et al. ..... 712/225 |
| 8,694,758 | B2 | * | 4/2014 | Orenstien et al. ............. 712/229 |

* cited by examiner

*Primary Examiner* — Kenneth Kim
(74) *Attorney, Agent, or Firm* — Nixon & Vanderhye P.C.

(57) ABSTRACT

A data processing system is provided in which destination operands to be stored within architectural registers are constrained to have zero values added as prefixes in order that the architectural register value has a fixed bit width irrespective of the bit width of the destination operand being written thereto. Instead of adding these zero values everywhere in the data path, they are instead represented by zero flags in at least the physical registers utilized for register renaming operations and in the result queue prior to results being written to the architectural register file. This saves circuitry resources and reduces energy consumption.

21 Claims, 6 Drawing Sheets

SETTING ZERO BITS IN ARCHITECTURAL REGISTER FOR STORING DESTINATION OPERAND OF SMALLER SIZE BASED ON CORRESPONDING ZERO FLAG ATTACHED TO RENAMED PHYSICAL REGISTER

BACKGROUND OF THE INVENTION

1. Field of the Invention

This invention relates to the field of data processing systems. More particularly, this invention relates to the management and manipulation of operands of different bit widths that have zero values added to form register values of a constant bit-width.

2. Description of the Prior Art

It is known to provide data processing systems that manipulate operands (source operands or destination operands) that have different bit-widths, such as single word operands (SW), double word operands (DW) and quad word operands (QW). Operands of these different bit widths may be stored within registers that have a constant bit-width, such as the width of a quad word. In some of these systems it is architecturally defined that when an operation of less than the register bit-width is written in to a register then it is prefixed with zero values filling the unused high-order portion of the register such that the full register is occupied with defined bit values. As an example, a 32-bit single word may be stored using a 128-bit register within the least significant 32-bits of that register and the remaining 96-bits of that register filled with zero values such that the entire 128-bit register is filled.

One possible way of achieving this type of operation is to add the zero bits to the operand whenever the operand is written in to a register and arrange all the registers to be of the constant maximum size, e.g. all the registers may be 128-bit registers capable of storing a full quad word operand as well as storing double word operands and single word operands that are prefixed with an appropriate number of zero values. However, a disadvantage with this approach is that a larger amount of physical overhead is required to store all of the zero values which effectively contain no useful information. Furthermore, energy is consumed in pushing these zero values along the data path of the processor system. In a system such as an out-of-order processor using register renaming, the physical registers used to store operands and for which mappings are held relating the physical registers to architectural registers represent a finite resource. Accordingly, inefficient use of the physical register resources provided can constrain the degree of out-of-order processing which may be achieved and the amount of speculation which may be supported.

SUMMARY OF THE INVENTION

Viewed from one aspect the present invention provides an apparatus for processing data comprising:

processing circuitry configured to respond to a program instruction to perform a processing operation upon one or more source operands read from respective source registers to generate a destination operand stored in a destination register, said destination register corresponding to an architectural register within an architectural set of registers addressed by said program instruction;

a plurality of physical registers configured to store source operand values and destination operand values processed by said processing circuitry; and register renaming circuitry configured to store register mapping data specifying a mapping indicating which physical registers within said plurality of physical registers are storing operand values corresponding to which architectural registers within said architectural set of registers;

wherein said destination operand has a bit width smaller than a bit width of said architectural register and said processing circuitry is configured to respond to said program instruction to set to zero values those bit values within said architectural register and not within said destination operand; and said physical register is associated with one or more zero flags, respective ones of said one or more zero flags indicating that a corresponding portion within said architectural register has zero bit values.

The present technique recognises that instead of storing the zero values which are to be added to a destination operand being written to a register it is possible to instead store one or more zero flags which represent the zero values to be added in a more compact and efficient manner. These zero flags may be stored using less hardware and passed around the processor consuming less energy. When architecturally necessary the zero flags may be used to control the adding of the required number of zero values to an operand to completely fill an architectural register of a fixed size as may be required for architecturally compliant behaviour.

The zero flags associated with the operands may be used in a variety of different places within the processor. In some embodiments register mapping data used as part of the register renaming may include the one more zero flags for respective physical registers mapped to an architectural register. In this way the register renaming circuitry can track the zero values which are associated with an operand without those zero values actually having to be added to the operand. The zero values can instead be represented by the one or more zero flags.

In some embodiments the register renaming circuitry may be configured to respond to the program instruction to allocate physical registers within a plurality of physical registers that are to be used to store the destination operand such that no physical registers within the plurality of physical registers are allocated to store zero values corresponding to zero values identified by the one or more zero flags. In this way, physical registers to be used in register renaming supporting out-of-order processing need not be allocated to store zero values that are to be added to an operand and instead can be represented by the zero flags. In this way the storage capability of the plurality of physical registers is more efficiently used and more register renaming may be supported without the resources of the physical registers being exhausted.

When instructions are being dispatched by dispatch circuitry for execution, their source operands are read from the physical registers. At this time, the one or more zero flags stored with the operand value within a rename table may be used to control the adding of zero values as specified by the one or more zero flags to the part of the source operand read from the physical register so as to form the full source operand, i.e. the part of the source operand stored within the physical register (e.g. a single word or a double word) together with a prefix of zero values of an appropriate length in order to form the desired size of operand to be manipulated by the data path.

The dispatch circuitry may be configured to associate one or more valid bits with the source operand being dispatched for processing. This permits portions of the source operand to be retrieved after the instruction has been dispatched. In this circumstance, the valid bits associated with portions of the source operand that are set to zero values as indicated by the one or more zero bits may be set to a valid status when the instruction is dispatched after the zero values have been added to form the source operand. Thus, the architecturally correct source operand is formed at dispatch time and passed into the data path in a manner in which the data path need not be concerned with the earlier way in which the source operand was represented including the use of one or more zero flags. A destination operand may be generated including one or more zero flags to avoid the need to drive large numbers of zero values used to pad the destination operand to a constant size when those zero values forming the padding effectively contain no useful information.

In some embodiments result queue circuitry and architectural register circuitry may be used. The architectural register circuitry may be formed to store architectural register values of the set of architectural registers (i.e. architectural register values having the full constant bit-width) and the result queue circuitry may be configured to store destination operands yet to be confirmed as non-speculative and written to the architectural register circuitry.

In the above context the result queue circuitry may be configured to store the one or more zero flags associated with the destination operand. These one or more zero flags may be read when writing the destination operand to an architectural register and, in dependence upon the one or more zero flags, control adding of zero values to the destination operand such that the bit width of the destination operand and the zero values added matches the bit width of the architectural register.

Thus, the zero values are added to the destination operand at the point at which the destination operand is written into the architectural register. This avoids having to move those zero values around the data path prior to the point at which they are written in to the architectural register thus saving energy and circuitry resources.

While it might be possible to use the one or more zero flags to trigger adding of zero values to values read from the architectural registers, this could introduce an undesirable delay on a critical path. In accordance with the above, architectural register values, including any zero values added as corresponding to the one or more zero flags, are stored within and read directly from the architectural register circuitry thereby avoiding unnecessarily adding additional delay to a potentially critical path when reading from the architectural register circuitry.

The architectural register circuitry may nevertheless in some embodiments store one or more zero flags for respective architectural registers so as to indicate any portions of that architectural register value that were set to zero values when it was written to the architectural register circuitry. In this way, when writing a new architectural register value over an existing architectural register value, those portions of the existing architectural register values indicated by the one or more zero flags as having already been set to zero values need not be rewritten when one or more zero flags stored within the result queue also indicate those portions should be set to zero values. There is no need to write zero values over existing zero values within the architectural registers when the one or more zero flags already indicate that the zero values are written in those locations.

Viewed from another aspect the present invention provides an apparatus for processing data comprising:

processing means for responding to a program instruction to perform a processing operation upon one or more source operands read from respective source register means for storing source operands to generate a destination operand stored in a destination register means for storing said destination operand, said destination register means corresponding to an architectural register within an architectural set of registers addressed by said program instruction;

a plurality of physical register means for storing source operand values and destination operand values processed by said processing means; and register renaming means for storing register mapping data specifying a mapping indicating which physical register means within said plurality of physical register means are storing operand values corresponding to which architectural registers within said architectural set of registers;

wherein said destination operand has a bit width smaller than a bit width of said architectural register and said processing means is configured to respond to said program instruction to set to zero values those bit values within said architectural register and not within said destination operand; and said physical register means is associated with one or more zero flags, respective ones of said one or more zero flags indicating that a corresponding portion within said architectural register has zero bit values.

Viewed from a further aspect the present invention provides a method of processing data comprising the steps of:

responding to a program instruction to perform a processing operation upon one or more source operands read from respective source register to generate a destination operand stored in a destination register means, said destination register corresponding to an architectural register within an architectural set of registers addressed by said program instruction;

storing within a plurality of physical registers source operand values and destination operand values; and storing register mapping data specifying a mapping indicating which physical register within said plurality of physical registers are storing operand values corresponding to which architectural registers within said architectural set of registers;

wherein said destination operand has a bit width smaller than a bit width of said architectural register and said program instruction sets to zero values those bit values within said architectural register and not within said destination operand; and said physical register is associated with one or more zero flags, respective ones of said one or more zero flags indicating that a corresponding portion within said architectural register has zero bit values.

The above, and other objects, features and advantages of this invention will be apparent from the following detailed description of illustrative embodiments which is to be read in connection with the accompanying drawings.

DESCRIPTION OF THE EMBODIMENTS

Figure 1:
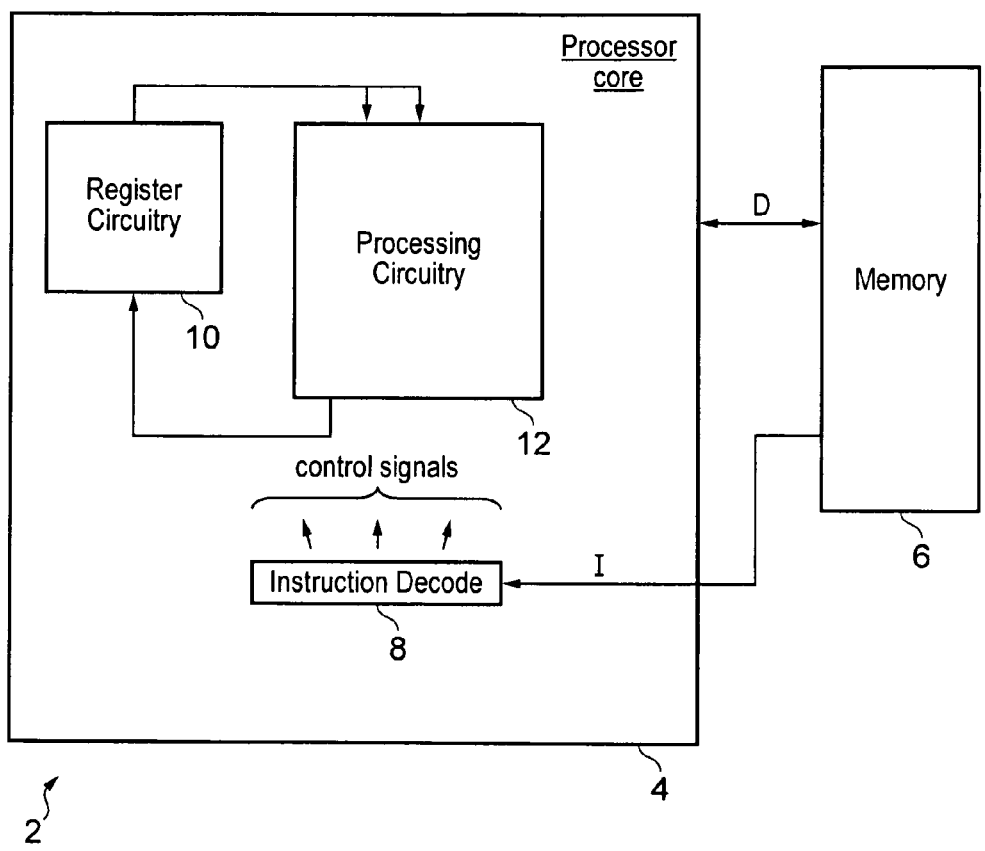
FIG. 1 schematically illustrates a data processing apparatus including register circuitry and processor circuitry.

FIG. 1 schematically illustrates a data processing system 2 including a processor core 4 and a memory 6. The memory 6 stores data values to be manipulated and program instructions for controlling manipulation of those data values. The program instructions are fetched and decoded by instruction decode circuitry 8 to generate control signals which control register circuitry 10 and processing circuitry 12 to perform processing operations specified by those program instructions. The register circuitry 10 may include, for example, normal general purpose registers and extension registers. The normal general purpose registers may be 32 or 64 bit registers. The extension registers may be, for example, 128-bit registers used to store either single word, double word or quad word operands. The present technique will be described further in relation to the extension registers having a bit width of 128-bits, but the present technique could equally be applied to the general purpose registers or registers of different bit widths.

The processor 4 is an out-of-order processor supporting speculative out-of-order execution of program instructions using techniques such as register renaming as will be familiar to those in this technical field. Register renaming itself will not be described in detail herein as it is a known technique. The register circuitry 10 illustrated in FIG. 1 includes the architectural registers circuitry, the physical register circuitry, the register renaming circuitry, the result queue circuitry, the dispatch circuitry and other circuitry associated with register access and supporting the register renaming operations.

Figure 2:
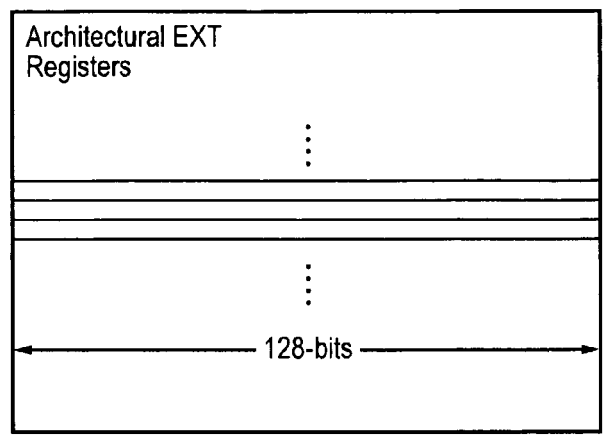
FIG. 2 schematically illustrates architectural registers of a constant bit-width.

FIG. 2 schematically illustrates a bank of 128-bit architectural registers. The architectural registers are those addressed (directly specified) by the program instructions. A program instruction will specify an architectural register using an architectural register specifying field. The underlying hardware implementation may use register renaming to allocate a physical register in place of the architectural register identified by the program instruction. Register renaming in this fashion helps support speculative execution of program instructions. An architectural constraint within the example embodiment described herein is that the programmer's view of the operation of the processor is that when an operand is written having a bit width less than the bit width of the architectural register in which it is stored, it is prefixed with zero values in order to extend its bit width up to the full 128-bits of the architectural register.

Figure 3:
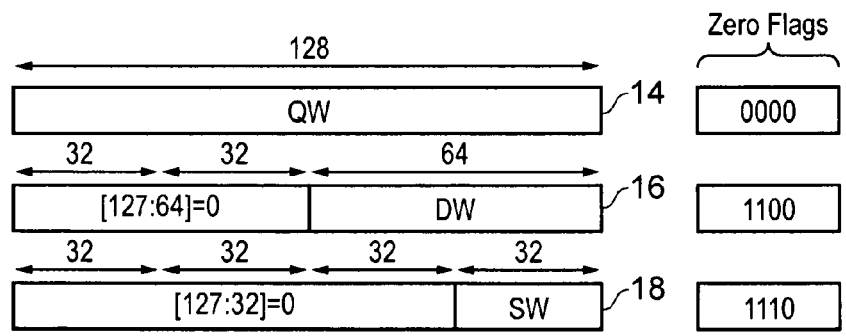
FIG. 3 schematically illustrates operand values of different bit-widths and having added zero values as indicated by accompanying zero flags.

FIG. 3 schematically illustrates the prefixing of operand values with zero values as discussed above. A quad word operand 14 requires no prefixing with zero values. A double word operand 16 has an operand with a bit width of 64 and accordingly requires a prefix of 64 zero values in order to completely fill a 128-bit architectural register. A single word operand 18 has a bit width of 32 and accordingly requires a 96-bit zero value prefix in order to completely fill the 128-bits of an architecture register.

Also shown in FIG. 3 are the zero flags which are associated with each of the operand values. The architectural register may be considered to be divided into four 32-bit fields and a zero flag is associated with each of these fields. If the zero flag is set, then this indicates that the corresponding field of 32-bits within the architectural register should be filled with zero values in order to extend the operand (be that a single word operand 18 or a double word operand 16) up to the full 128-bit width of the architectural register. Thus, the zero flags for a quad word operand 14 are set to "0000" to indicate no zero values need to be added. The zero flags for a double word operand 18 are set to "1100" to indicate that the first two 32-bit fields should be set to zero values which form a prefix for the double word operand 16. The zero flags for the single word operand 18 are "1110" to indicate that the three 32-bit fields should all set to zero values as a prefix to the single word operand 18 so as to fill the full 128-bits of the architectural register.

Figure 4:
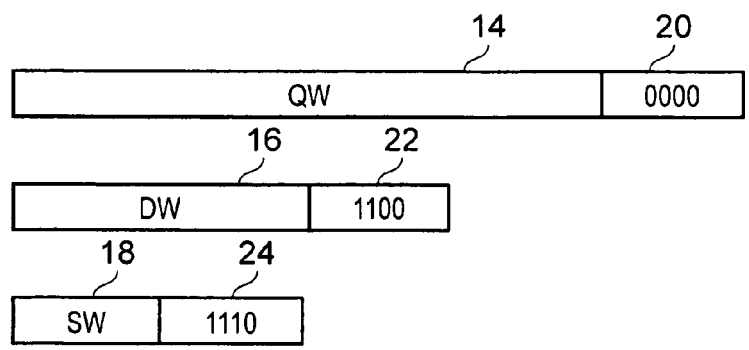
FIG. 4 schematically illustrates operand values of different bit-widths without their added zero values and accompanied by appropriate zero flags.

FIG. 4 illustrates how the different operands 14, 16, 18 and their associated zero flags 20 22, 24 may be stored in a more efficient manner. The storage of the single word operand 18 and the double word operand 16 together with their zero flags 24, 22 is more efficient than having to store the full 128-bit architectural register value to which they correspond as the fields of zero values to be added are represented by a single bit within the zero flag. This saves storage space and also reduces energy consumption as the zero flags can be passed around the processor core 4 with less energy consumption than passing around wide fields of zero values which are effectively conveying no information (or at least conveying that information highly inefficiently).

Figure 5:
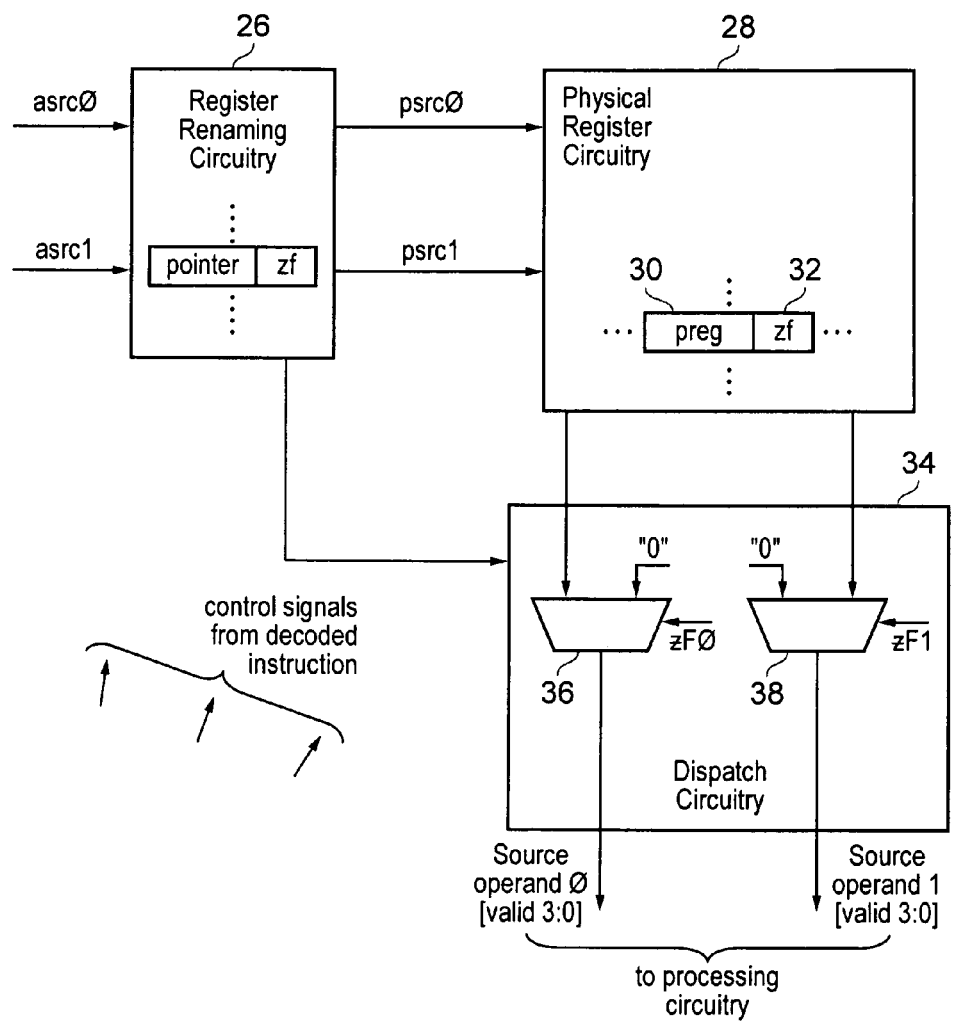
FIG. 5 schematically illustrates register renaming circuitry, physical register circuitry and dispatch circuitry used in instruction dispatch to the processing circuitry.

FIG. 5 schematically illustrates a portion of the register circuitry 10 associated with instruction dispatch. Register renaming circuitry 26 receives, for a classic triadic RISC instruction, two source operand specifiers asrc0 and asrc1. The register renaming circuitry maps these architectural register specifiers to physical register specifiers psrc0 and psrc1. The register renaming circuitry 26 retains a pointer indicating to which physical register an architectural register is currently mapped. For each mapping which forms part of this register mapping data, there are also stored other data and qualifiers such as the operand size, validity flags and, in accordance with the present technique, zero flags as discussed above. The zero flags zf indicate what fields of zero values should be added to the operands stored within the physical register identified by the pointer when that operand is eventually written in to an architectural register as a destination operand.

The physical register circuitry 28 includes a plurality of physical registers 30. These physical registers 30 store the operand values which serve as source operands and destination operands. Associated with each physical register 30 are zero flags 32 which indicate how many fields of zero values should be added to the operand values stored within that physical register 30. Storing the zero flags 32 instead of the full fields of added zero values makes better use of the storage capabilities of the physical register circuitry 28. Thus, it is more likely that physical registers will be available for use by the register renaming circuitry 26 in order to permit register renaming and out-of-order speculative execution of program instructions to be supported in accordance with the known out-of-order processing techniques.

Dispatch circuitry 34 coupled to the register renaming circuitry 26 and the physical register circuitry 28 serves to dispatch program instructions to the processing circuitry 12 for execution. When program instructions are dispatched, the source operands together with valid flags are supplied to the data paths concerned. Multiplexers 36, 38 within the dispatch circuitry 34 are responsive to the zero flags associated with each of the source operands read from the register renaming circuitry 26 to add zero values to the portions of the source operands read out of the physical register 30 so as to form the full source operand value which is passed to the data path. Thus, at the point at which source operands are passed to the data path, they have their zero values added to them such that they form the architecturally required constant width operands including their zero value prefixes. The data paths thus do not need to interpret zero flags in relation to their source operands.

Figure 6:
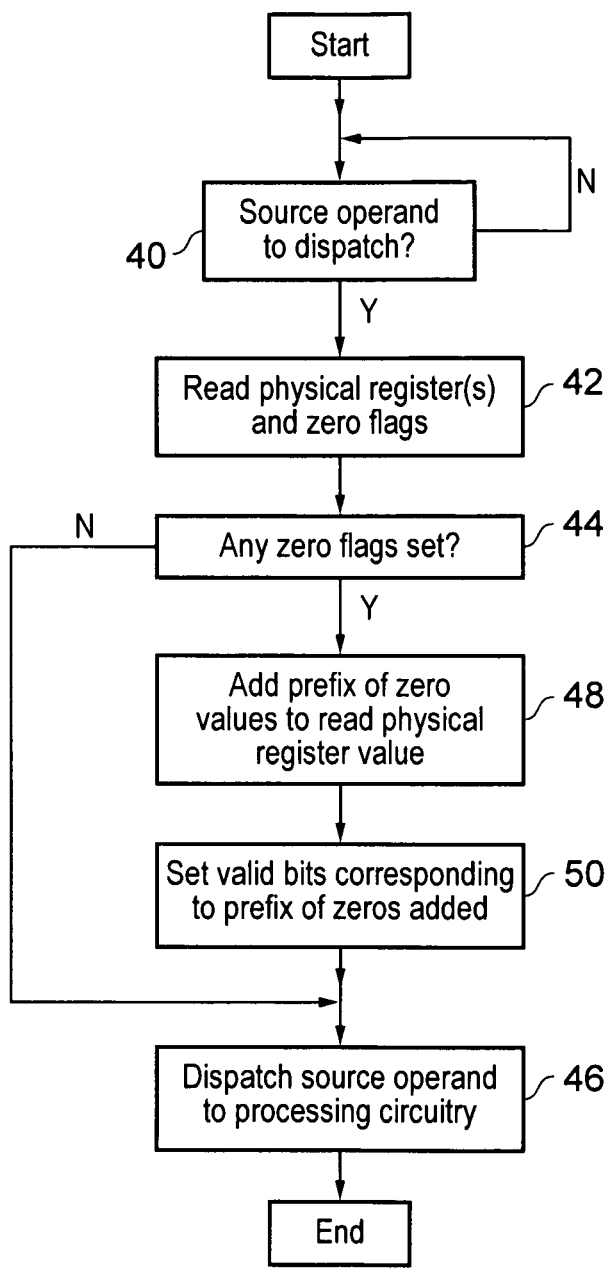
FIG. 6 is a flow diagram schematically illustrating the operation of the circuitry of FIG. 5.

FIG. 6 is a flow diagram schematically illustrating the operation of the circuitry of FIG. 5. At step 40, processing waits until a source operand is ready to be dispatched. At step 42, the physical register and the zero flags for the source operand are read. Step 44 determines whether any zero flags are set. If no zero flags are set, such as in the case of a quad word operand, then processing proceeds directly to step 46 where the source operand is dispatched to the processing circuitry as an input to the execution to be performed as specified by the program instruction. If the determination at step 44 is that one or more of the zero flags are set, then processing proceeds to step 48 which adds a prefix of zero values to the read physical register value 30. At step 50, the valid bits corresponding to the prefix of zero values that have been added are set to indicate that those portions of the source operand are valid. The later valid bits may be set as the source operand progresses along the data path in accordance with known techniques of speculative execution that support the late provision of valid operand(s).

Figure 7:
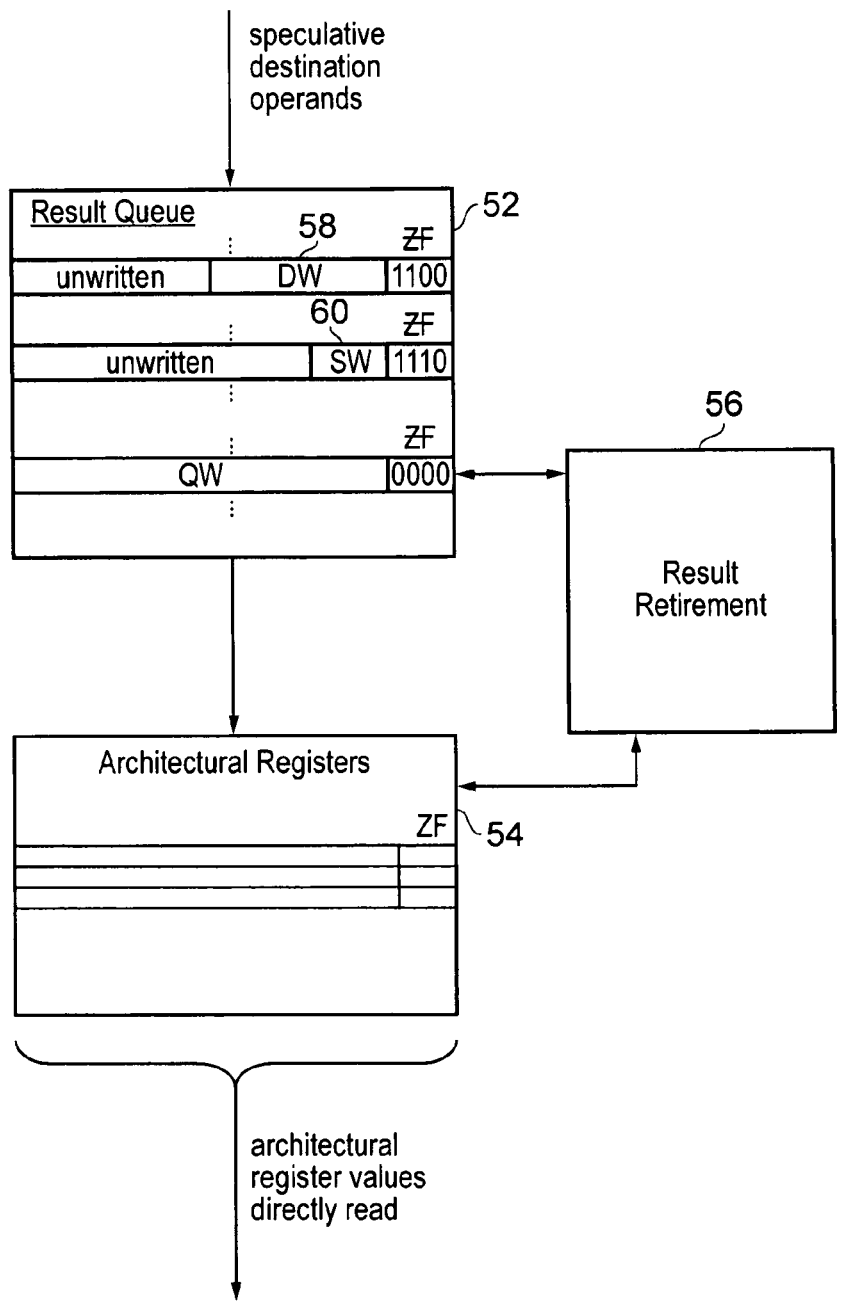
FIG. 7 schematically illustrates a result queue and architectural registers in to which results are retired when they become non-speculative.

FIG. 7 schematically illustrates a portion of the register circuitry 10 including result queue circuitry 52, architectural register circuitry 54 and result retirement circuitry 56. Speculative destination operands are written into the result queue 52 which already contains corresponding zero flags written at dispatch time. In the example shown, a double word destination operand 58 and a single word destination operand 60 are stored within the result queue with associated zero flags and with the most significant prefix portion required to expand these destination operands 58, 60 to the full 128-bit width of the architectural register being unwritten. Not writing these prefix portions with zero values at this stage reduces energy consumption. When the result retirement circuitry 56 determines that a speculative destination operand within the result queue circuitry 52 has become non-speculative, it is written into the architectural register circuitry 54. At this time, the zero flags zf are read and used to control the adding of zero values to the destination operand 58, 60 so as to form a value stored within the architectural register (i.e. an architectural register value) of the full bit width matching the bit width of the architectural register (128-bits). Having written the full architectural register value into the architectural register value into the architectural register circuitry 54 it becomes possible to directly read architectural register values from the architectural register circuitry 54. This eases timing constraints that would otherwise be associated with the reading of architectural register values.

Figure 8:
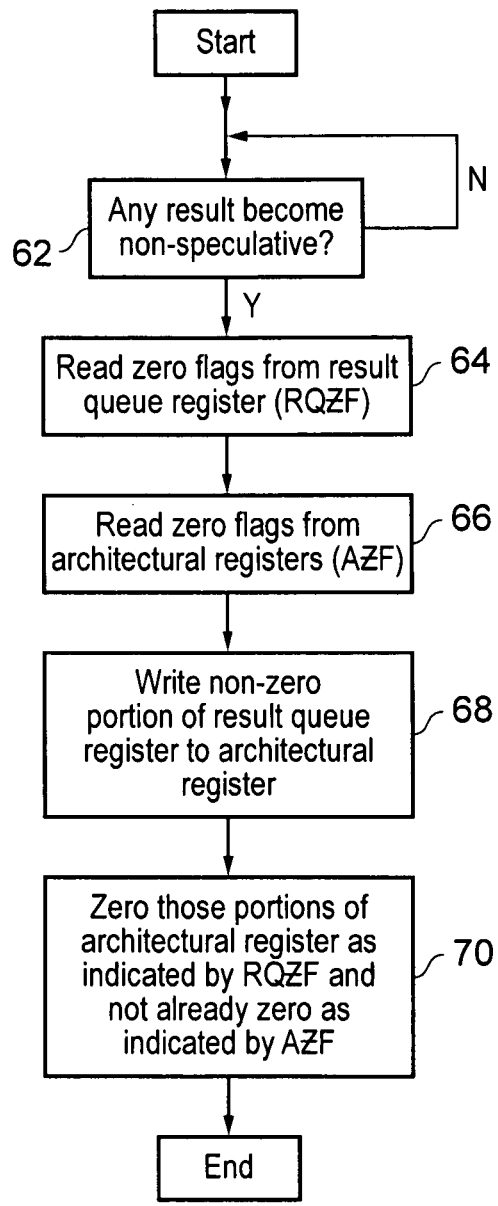
FIG. 8 is a flow diagram schematically illustrating the operation of the circuitry of FIG. 7.

FIG. 8 is a flow diagram schematically illustrating the operation of the circuitry of FIG. 7. At step 62 processing waits until any result becomes non-speculative. At step 64 the zero flags from the result queue associated with the newly non-speculative result are read. Step 66 then reads the zero flags from the architectural register into which the new result is to be written. If the zero flags of the architectural register into which the new result is to be written overlap with those of the new result value, then this indicates that the architectural register already contains zero values for those portions corresponding to the set zero flags. Thus, these already zeroed portions need not be rewritten when the new result value is written into that architectural register. Avoiding rewriting of zero values on top of zero values which are already present saves energy. At step 68, the non-zero portion of the result queue register contents are written to the desired target architectural register. At step 70, those portions of the architectural register as indicated by the result queue zero flags are not already set to zero as indicated by the architectural zero flags are written to zero values.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
processing circuitry configured to respond to a program instruction to perform a processing operation upon one or more source operands read from respective source registers to generate a destination operand stored in a destination register, said destination register corresponding to an architectural register within an architectural set of registers addressed by said program instruction;
a plurality of physical registers configured to store source operand values and destination operand values processed by said processing circuitry; and
register renaming circuitry configured to store register mapping data specifying a mapping indicating which physical registers within said plurality of physical registers are storing operand values corresponding to which architectural registers within said architectural set of registers;
wherein said destination operand has a bit width smaller than a bit width of said architectural register and said processing circuitry is configured to respond to said program instruction to set to zero values those bit values within said architectural register and not corresponding to bits of said destination operand; and
said physical register is associated with one or more zero flags, respective ones of said one or more zero flags indicating that a corresponding portion within said architectural register has zero bit values.

2. Apparatus as claimed in claim 1, wherein said register mapping data includes one or more zero flags for respective physical registers mapped to an architectural register by said register mapping data.

3. Apparatus as claimed in claim 2, wherein said register renaming circuitry is configured to respond to said program instruction to allocate physical registers within said plurality of physical registers to store said destination operand such that no physical registers within said plurality of physical registers are allocated to store zero values corresponding to zero values identified by said one or more zero flags.

4. Apparatus as claimed in claim 2, comprising dispatch circuitry coupled to said register renaming circuitry and configured to dispatch program instructions for execution by said processing circuitry, wherein said dispatch circuitry reads said one or more zero flags for respective physical registers storing at least a part of a source operand of a program instruction to be dispatched for execution and adds zero values as specified by said one or more zero flags to said at least part of a source operand to form said source operand of said program instruction.

5. Apparatus as claimed in claim 4, wherein said dispatch circuitry is configured to associate one or more valid bits with said source operand indicating which portions of said source operand are storing valid data and said dispatch circuitry sets to a state indicating valid any valid bits within said one or more valid bits that correspond to portions of said source operand set to zero values as indicated by said one or more zero bits.

6. Apparatus as claimed in claim 1, comprising result queue circuitry and architectural register circuitry, said architectural register circuitry configured to store architectural register values of said set of architectural registers and said result queue circuitry configured to store destination operands yet to be confirmed as non-speculative and written to said architectural register circuitry.

7. Apparatus as claimed in claim 6, wherein said result queue circuitry is configured to store said one or more zero flags associated with said destination operand and to read said one or more zero flags when writing said destination operand to an architectural register and, in dependence upon said one or more zero flags, to add zero values to said destination operand such that a bit width of said destination operand and said zero values added matches a bit width of said architectural register.

8. Apparatus as claimed in claim 7, wherein architectural register values, including any zero values added as corresponding to said one or more zero flags, are read directly from said architectural register circuitry.

9. Apparatus as claimed in claim 7, wherein said architectural register circuitry is configured to store one or more zero flags for respective architectural register values stored so as to indicate any portions of said architectural register value that were set to zero values when written to said architectural register circuitry.

10. Apparatus as claimed in claim 9, wherein said architectural register circuitry is configured such that, when writing a new architectural register value over an existing architectural register value, portions of said existing architectural register values indicated by said one or more zero flags stored in said architectural register circuitry as having been set to zero values are not rewritten when said one or more zero flags stored within said result queue also indicate those portions should be set to zero values.

11. Apparatus for processing data comprising:
processing means for responding to a program instruction to perform a processing operation upon one or more source operands read from respective source register means for storing source operands to generate a destination operand stored in a destination register means for storing said destination operand, said destination register means corresponding to an architectural register within an architectural set of registers addressed by said program instruction;
a plurality of physical register means for storing source operand values and destination operand values processed by said processing means; and
register renaming means for storing register mapping data specifying a mapping indicating which physical register means within said plurality of physical register means are storing operand values corresponding to which architectural registers within said architectural set of registers;
wherein said destination operand has a bit width smaller than a bit width of said architectural register and said processing means is configured to respond to said program instruction to set to zero values those bit values within said architectural register and not corresponding to bits of said destination operand; and
said physical register means is associated with one or more zero flags, respective ones of said one or more zero flags indicating that a corresponding portion within said architectural register has zero bit values.

12. A method of processing data comprising the steps of:
responding to a program instruction to perform a processing operation upon one or more source operands read from respective source register to generate a destination operand stored in a destination register means, said destination register corresponding to an architectural register within an architectural set of registers addressed by said program instruction;
storing within a plurality of physical registers source operand values and destination operand values; and
storing register mapping data specifying a mapping indicating which physical register within said plurality of physical registers are storing operand values corresponding to which architectural registers within said architectural set of registers;
wherein said destination operand has a bit width smaller than a bit width of said architectural register and said program instruction sets to zero values those bit values within said architectural register and not corresponding to bits of said destination operand; and
said physical register is associated with one or more zero flags, respective ones of said one or more zero flags indicating that a corresponding portion within said architectural register has zero bit values.

13. A method as claimed in claim 12, wherein said register mapping data includes one or more zero flags for respective physical registers mapped to an architectural register by said register mapping data.

14. A method as claimed in claim 13, comprising allocating physical registers within said plurality of physical registers to store said destination operand such that no physical registers within said plurality of physical registers are allocated to store zero values corresponding to zero values identified by said one or more zero flags.

15. A method as claimed in claim 13, comprising dispatching program instruction for execution including reading said one or more zero flags for respective physical registers storing at least a part of a source operand of a program instruction to be dispatched for execution and adding zero values as specified by said one or more zero flags to said at least part of a source operand to form said source operand of said program instruction.

16. A method as claimed in claim 15, comprising associating one or more valid bits with said source operand indicating which portions of said source operand are storing valid data and setting to a state indicating valid any valid bits within said one or more valid bits that correspond to portions of said source operand set to zero values as indicated by said one or more zero bits.

17. A method as claimed in claim 12, comprising storing architectural register values of said set of architectural registers within architectural register circuitry and storing within result queue circuitry destination operands yet to be confirmed as non-speculative and written to said architectural register circuitry.

18. A method as claimed in claim 17, comprising storing within said result queue circuitry said one or more zero flags associated with said destination operand and reading said one or more zero flags when writing said destination operand to an architectural register and, in dependence upon said one or more zero flags, adding zero values to said destination operand such that a bit width of said destination operand and said zero values added matches a bit width of said architectural register.

19. A method as claimed in claim 18, wherein architectural register values, including any zero values added as corresponding to said one or more zero flags, are read directly from said architectural register circuitry.

20. A method as claimed in claim 18, comprising storing within said architectural register circuitry one or more zero flags for respective architectural register values stored so as to indicate any portions of said architectural register value that were set to zero values when written to said architectural register circuitry.

21. A method as claimed in claim 20, wherein, when writing a new architectural register value over an existing architectural register value, portions of said existing architectural register values indicated by said one or more zero flags stored in said architectural register circuitry as having been set to zero values are not rewritten when said one or more zero flags stored within said result queue also indicate those portions should be set to zero values.

* * * * *